US012761539B2

(12) United States Patent
Shiffler

(10) Patent No.: US 12,761,539 B2
(45) Date of Patent: Oct. 13, 2026

(54) OPTICAL ACCESSORY CASE

(71) Applicant: Michael the Maven, LLC, Sheridan, WY (US)

(72) Inventor: Michael Shiffler, Sheridan, WY (US)

(73) Assignee: MICHAEL THE MAVEN, LLC, Sheridan, WY (US)

(*) Notice: Subject to any disclaimer, the term of this patent is extended or adjusted under 35 U.S.C. 154(b) by 163 days.

(21) Appl. No.: 18/616,491

(22) Filed: Mar. 26, 2024

(65) Prior Publication Data

US 2024/0329502 A1 Oct. 3, 2024

Related U.S. Application Data

(60) Provisional application No. 63/454,994, filed on Mar. 28, 2023.

(51) Int. Cl.

| | |
|---|---|
| ***G03B 17/56*** | (2021.01) |
| ***A45C 11/24*** | (2006.01) |
| ***A45C 13/10*** | (2006.01) |

(52) U.S. Cl.

CPC ............ *G03B 17/566* (2013.01); *A45C 11/24* (2013.01); *A45C 13/1069* (2013.01); *A45C 13/1084* (2013.01); *A45C 2200/10* (2013.01)

(58) Field of Classification Search

None

See application file for complete search history.

(56) References Cited

U.S. PATENT DOCUMENTS

| | | | |
|---|---|---|---|
| 2,344,919 A * | 3/1944 | Allcott | G11B 33/04 369/291.1 |
| D259,748 S * | 7/1981 | Outcalt | D3/263 |
| 5,501,326 A * | 3/1996 | Shuhsiang | G11B 33/0422 |
| 5,535,884 A * | 7/1996 | Scott | G11B 33/0444 |
| 5,590,770 A * | 1/1997 | Yeh | G11B 33/0444 |
| 5,617,950 A * | 4/1997 | Chung | G11B 33/0444 |
| 5,697,498 A * | 12/1997 | Weisburn | G11B 33/045 206/311 |
| 5,726,731 A * | 3/1998 | Toler | G02C 5/003 206/316.1 |
| D412,062 S * | 7/1999 | Potter | D3/294 |
| 6,050,404 A * | 4/2000 | Lee | G11B 33/0472 |
| D479,429 S * | 9/2003 | Chan | D6/634 |
| 6,837,368 B1 * | 1/2005 | Chang | G11B 33/0444 |
| 7,441,663 B2 * | 10/2008 | Osborn | B65D 25/06 209/614 |
| D1,052,274 S * | 11/2024 | Liu | D3/303 |
| 2003/0042154 A1* | 3/2003 | Koch | G11B 33/0444 |
| 2009/0223843 A1* | 9/2009 | Hong | G11B 33/0444 206/308.1 |
| 2015/0329237 A1* | 11/2015 | Olsen | B42F 15/0058 229/67.3 |
| 2017/0305650 A1* | 10/2017 | Coulter | B65D 5/4237 |

FOREIGN PATENT DOCUMENTS

| | | |
|---|---|---|
| CN | 213366545 U * | 6/2021 |
| CN | 222906285 U * | 5/2025 |

* cited by examiner

*Primary Examiner* — Rodney E Fuller

(74) *Attorney, Agent, or Firm* — Travis Banta; Ascent IP Law

(57) ABSTRACT

An optical accessory case includes a cap connected to a base. The base of the optical accessory case includes one or more dividers in the base of the optical accessory case. One or more dividers include a pedestal which is attached to the base and a column which is attached to the pedestal.

17 Claims, 5 Drawing Sheets

OPTICAL ACCESSORY CASE

PRIORITY CLAIM

This application claims priority to and benefit of U.S. Provisional Application Ser. No. 63/454,994 filed on Mar. 28, 2023, which is incorporated herein by reference in its entirety, including, but not limited to those portions that specifically appear hereinafter, the incorporation by reference being made with the following exception: In the event that any portion of the above-referenced provisional application is inconsistent with this application, the application supersedes the above referenced provisional application.

TECHNICAL FIELD

This disclosure relates generally to an optical accessory case.

BACKGROUND

The camera lens case, also known as a lens pouch, is a protective cover designed to keep camera lenses and other accessories such as filters safe from scratches, dust, and other damage. Also, a designated case or a pouch to place camera lenses improves storage for transportation and location. Lens cases have existed for nearly as long as cameras themselves, evolving to meet the changing needs of photographers.

In the early days of photography, lenses, filters, and other accessories were large and bulky, often made of brass or other metals. They were typically stored in wooden boxes, which were custom-made to fit the specific lens. These boxes were often lined with velvet or other soft materials to protect the lens from scratches and other damage.

As photography technology evolved, so did the design of the camera lens case. In the early 20th century, as cameras became more portable and affordable, camera lenses, filters, and other accessories began to be sold separately from the camera body. This led to the development of more specialized cases, designed to fit specific lenses, filters, and other accessories to provide added protection during transport.

During the mid-20th century, with the rise of 35 mm SLR cameras, camera lens cases became even more popular. Many camera manufacturers began offering custom-designed cases for their lenses, filters, and other accessories often featuring a hard exterior shell and a soft, padded interior. These cases were designed to be compact and portable, allowing photographers to easily transport their accessories while on the go.

In the digital age, camera cases continue to evolve, with new materials and designs that offer even greater protection and convenience. Many modern cases are made from durable, water-resistant materials like neoprene or nylon, and feature customizable dividers that can accommodate a range of different lenses or filters. In recent years, camera lens cases have also become a popular accessory among outdoor and adventure photographers, who need to protect their gear from the elements while on the go. Many cases now feature built-in rain covers and other weatherproofing features, making them ideal for use in rugged outdoor environments.

However, improvements in camera accessory technology are needed. Since there are various types and styles of lenses, filters, and other accessories there need to be cases that are compatible with the various accessories to allow the user to easily access and organize the accessories. For example, magnetic accessories may have the ability to magnetically link to each other which helps keep all the accessories together and in one place. The problem arises when the user wishes to separate one accessory from others, the magnetic properties of the accessory may make it difficult to separate and choose the appropriate option, especially in a time-sensitive manner. Often the perfect light for camera pictures is fleeting and timing is essential; it is therefore imperative to be able to select and remove the appropriate accessory in a timely manner.

SUMMARY

This disclosure relates generally to an optical accessory case that includes a cap connected to a base. The base includes one or more dividers. One or more dividers include a pedestal, attached to the base and a column attached to the pedestal.

BRIEF DESCRIPTION OF THE DRAWINGS

Non-limiting and non-exhaustive implementations of the present disclosure are described with reference to the following figures, wherein similar or like reference numerals refer to similar or like parts throughout the various views unless otherwise specified. The advantages of the present disclosure will become better understood regarding the following description and accompanying drawings.

DETAILED DESCRIPTION

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar methods.

Reference will now be made in detail to the exemplary embodiments, examples of which are illustrated in the accompanying drawings. Wherever possible, the same or similar reference numbers are used throughout the drawings to refer to the same or similar parts. It is further noted that elements disclosed with respect to particular embodiments are not restricted to only those embodiments in which they are described. For example, an element described in reference to one embodiment or figure may be alternatively included in another embodiment or figure regardless of whether or not those elements are shown or described in another embodiment or figure. In other words, elements in the figures may be interchangeable between various embodiments disclosed herein, whether shown or not.

Other embodiments will be apparent to those skilled in the art from consideration of the specification and practice of the disclosure disclosed herein. It is intended that the specification and examples be considered exemplary only, with a true scope and spirit of the invention being indicated by the recited claims.

Figure 1:
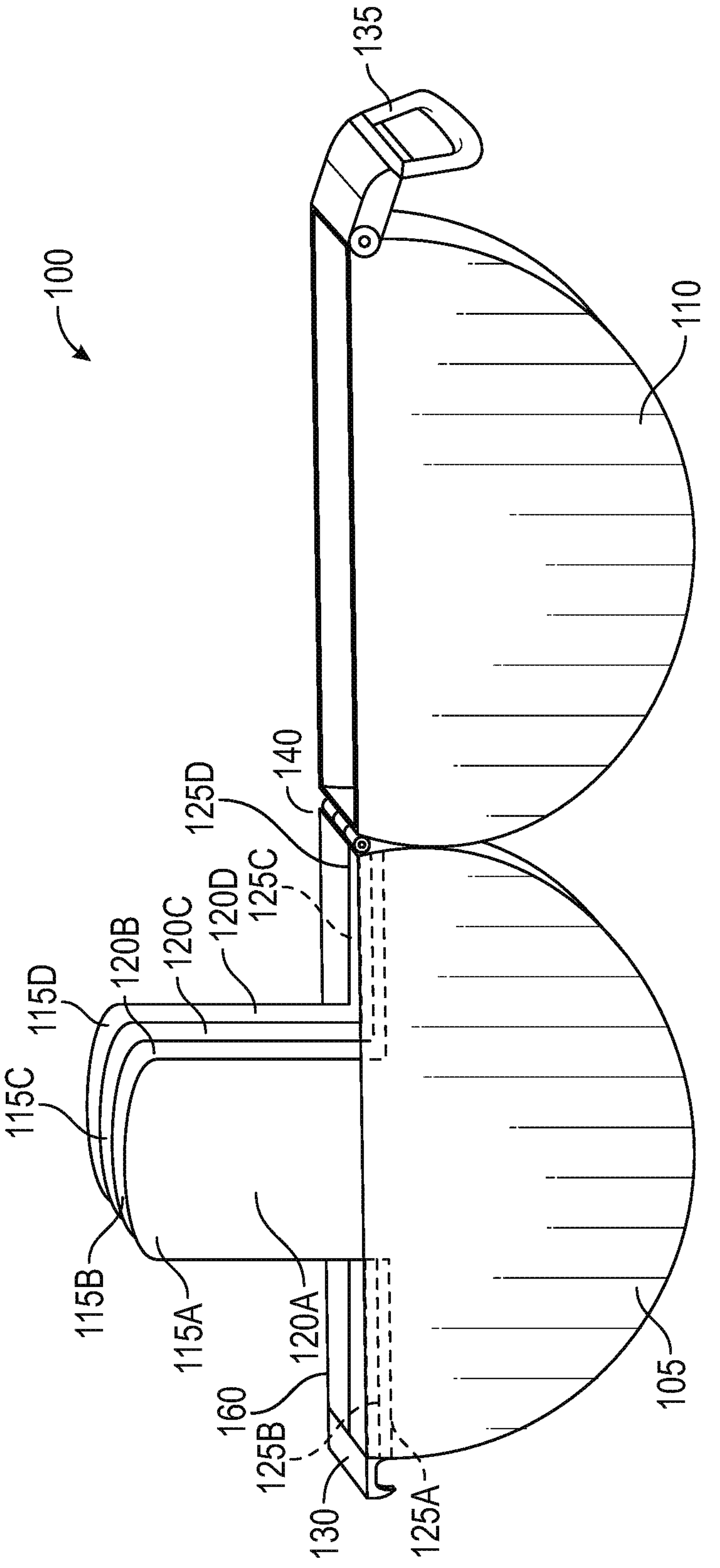
FIG. 1 illustrates a side view of an open and empty optical accessory case.

FIG. 1 illustrates a side view of open and empty optical accessory case 100. Accessory case 100 may be cylindrical in shape when in a closed position and include base 105, which may constitute the first portion of the cylinder, and cap 110 which may constitute the second portion of the cylinder. In an alternative embodiment, one or more of cap 110 and base 104 may be a cuboidal, spherical, or polyhedral shape. The outside portion of cap 110 and the outside portion of base 105 may be substantially similar in shape and/or size. Substantially in this circumstance means within 10%. Further, one or more of base 105 and cap 110 may be transparent or semitransparent allowing the visibility of one or more accessories placed within case 100 through base 105 and/or cap 110. Cap 110 may attach to base 105 by hinge 140. The first end of hinge 140 may attach to a first edge of cap 110. A second end of hinge 140 may attach to a first edge of base 105. This may allow accessory case 100 to be opened and closed both protecting and allowing access to the inside portions of both base 105 and cap 110. Latch 135 may be attached to a second edge of cap 110 and anchor 130 may be attached to a second edge of base 105. When in an opened position latch 135 and anchor 130 may be located at opposite ends of case 100. When in a closed position cap 110 may be positioned on top of base 105. In a closed position, latch 135 may interact with anchor 130 releasably securing cap 110 to base 105. Alternatively, cap 110 may include anchor 130 and base 105 may include latch 135. Further, in an alternate embodiment, accessory case 100 may include cap 110 and base 105 without one or more of hinge 140, latch 135, and anchor 130 wherein their attachment may be facilitated through one or more of the attachments listed below.

The interaction between latch 135 and anchor 130 may similarly be exchanged with various types of connectors including but not limited to latches such as cam, compression, slam, swell, or sliding latches, or catches such as magnetic catches friction catches, touch catches, recessed catches, specialty catches, or other conventional connecting attachments such as a snap, hook and loop, compression fit, magnetic attachments or other attachments known in the art.

Base 105 may further include one or more dividers 115A-D. If a plurality of dividers 115A-D is included in case 100 the distance between each divider and between the divider and the outer edge of base 105 may vary. For example, the two outside slots may be wider than the three middle slots. Further, one of the outside slots may be wider than the other creating large, medium, and small slots. The different sizes of slots may accommodate different-sized accessories.

Dividers 115A-D may include pedestals 125A-D and columns 120A-D. Pedestals 125A-D may attach to base 105 along an inside edge of base 105. Alternatively, pedestals 125A-D may attach to base 105 at a plurality of locations. The attachment of pedestals 125A-D may be continuous along the inside portion of base 105. The upper portion of pedestals 125A-D may end before upper edge 160 of base 105. Columns 120A-D may attach to pedestals 125A-D and extend upward beyond upper edge 160 of base 105. The bottom portion of columns 120A-D, at the point of attachment to pedestals 125A-D, may be narrower than the upper portion of pedestals 125A-D.

Columns 120A-D may extend off pedestals 125A-D substantially perpendicular to the horizontal plane defined by the upper portion of pedestals 125A-D. The upper end of columns 120A-D may be rounded such that the upper end of columns 120A-D does not contact cap 110 when in a closed position. Columns 120A-D may be narrower than the optical accessories placed within case 100 which may allow magnetic attraction to occur between different accessories. An accessory placed in a slot, next to one or more dividers 115A-D, may extend above the upper end of columns 120A-D. Alternatively, the upper end of columns 120A-D may extend beyond one or more accessories that are placed within case 100.

Accessories may be placed within case 100. Some magnetic attraction may exist between the different accessories as they rest within case 100. This magnetic attraction may keep accessories snuggly positioned within case 100 to help prevent the jostling of the accessories within case 100. Further, the magnetic attraction may help keep the accessories from falling out even when cap 110 is unlatched or unattached to base 105. Dividers 115A-D, while allowing magnetic attraction, may also reduce the magnetic attraction by creating a distance between the accessories. For example, the width of dividers 115A-D separates a plurality of optical accessories while still allowing magnetic attraction to exist between two or more of the plurality of accessories when placed within case 100. This in turn may aid in the removal of an individual accessory.

Figure 2:
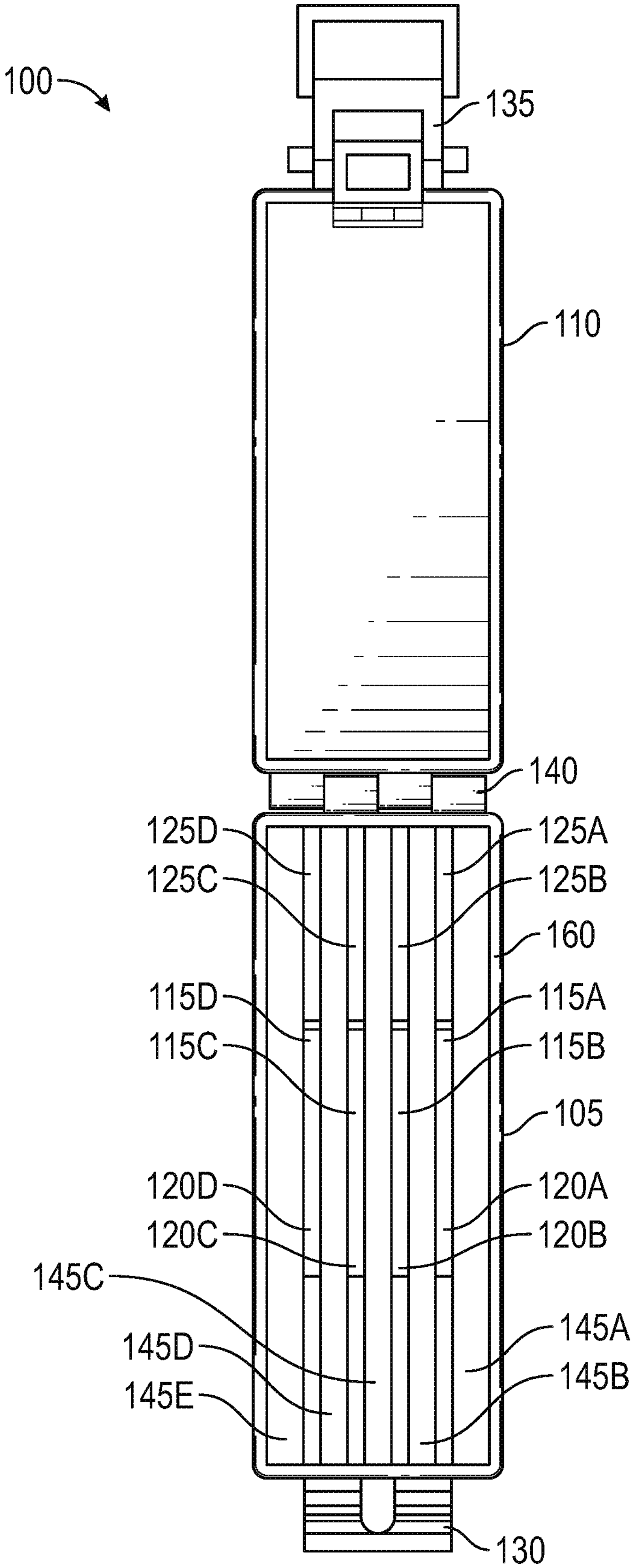
FIG. 2 illustrates a top view of an open and empty optical accessory case.

FIG. 2 illustrates a top view of open and empty optical accessory case 100. Accessory case 100 may be cylindrical in shape when in a closed position and include base 105, which may constitute the first portion of the cylinder, and cap 110 which may constitute the second portion of the cylinder. In an alternative embodiment, one or more of cap 110 and base 104 may be a cuboidal, spherical, or polyhedral shape. The outside portion of cap 110 and the outside portion of base 105 may be substantially similar in shape and/or size. Substantially in this circumstance means within 10%. Further, one or more of base 105 and cap 110 may be transparent or semitransparent allowing the visibility of one or more accessories placed within case 100 through base 105 and/or cap 110. Cap 110 may attach to base 105 by hinge 140. A first end of hinge 140 may attach to a first edge of cap 110. A second end of hinge 140 may attach to a first edge of base 105. This may allow accessory case 100 to be opened and closed both protecting and allowing access to the inside portions of both base 105 and cap 110. Latch 135 may be attached to a second edge of cap 110 and anchor 130 may be attached to a second edge of base 105. When in an opened position latch 135 and anchor 130 may be located at opposite ends of case 100. When in a closed position cap 110 may be positioned on top of base 105. In a closed position, latch 135 may interact with anchor 130 releasably securing cap 110 to base 105. Alternatively, cap 110 may include anchor 130 and base 105 may include latch 135. Further, in an alternate embodiment, accessory case 100 may include cap 110 and base 105 without one or more of hinge 140, latch 135, and anchor 130 wherein their attachment may be facilitated through one or more of the attachments listed below.

The interaction between latch 135 and anchor 130 may similarly be exchanged with various types of connectors including but not limited to latches such as cam, compression, slam, swell, or sliding latches, or catches such as magnetic catches friction catches, touch catches, recessed catches, specialty catches, or other conventional connecting attachments such as a snap, hook and loop, compression fit, magnetic attachments or other attachments known in the art.

Base 105 may further include one or more dividers 115A-D. If a plurality of dividers 115A-D is included in case 100 the distance between each divider and between the divider and the outer edge of base 105 may vary. The space created by the distance between dividers 115A-D and between dividers 115A and 115D and the outside edge may create slots 145A-E where accessories may be placed. For example, the two outside slots 145A and 145E may be wider than slots 145B-D. Further, slot 145A may be wider than slot 145E creating large (145A), medium 145E, and small slots (145B-D). The different sizes of slots may accommodate different-sized accessories. Alternatively, slots 145A-E may be equally sized.

Dividers 115A-D may include pedestals 125A-D and columns 120A-D. Pedestals 125A-D may attach to base 105 along an inside edge of base 105. Alternatively, pedestals 125A-D may attach to base 105 at a plurality of locations. The attachment of pedestals 125A-D may be continuous along the inside portion of base 105. The upper portion of pedestals 125A-D may end before the upper edge of base 105. Columns 120A-D may attach to pedestals 125A-D and extend upward beyond upper edge 160 of base 105. The bottom portion of columns 120A-D, at the point of attachment to pedestals 125A-D, may be narrower than the upper portion of pedestals 125A-D.

Columns 120A-D may extend off pedestals 125A-D substantially perpendicular to the horizontal plane defined by the upper portion of pedestals 125A-D. The upper end of columns 120A-D may be rounded such that the upper end of columns 120A-D does not contact cap 110 when in a closed position. Columns 120A-D may be narrower than the optical accessories placed within case 100 which may allow magnetic attraction to occur between different accessories. An accessory placed in a slot, next to one or more dividers 115A-D, may extend above the upper end of columns 120A-D. Alternatively, the upper end of columns 120A-D may extend beyond one or more accessories that are placed within case 100.

Accessories may be placed within case 100. Some magnetic attraction may exist between the different accessories as they rest within case 100. This magnetic attraction may keep accessories snuggly positioned within case 100 to help prevent the jostling of the accessories within case 100. Further, the magnetic attraction may help keep the accessories from falling out even when cap 110 is unlatched or unattached to base 105. Dividers 115A-D, while allowing magnetic attraction, may also increase the distance and reduce the magnetic attraction between accessories, such as camera lenses by creating a distance between the accessories. For example, the width of dividers 115A-D separates a plurality of optical accessories while still allowing magnetic attraction to exist between two or more of the plurality of accessories when placed within case 100. This in turn may aid in the removal of an individual accessory.

Figure 3:
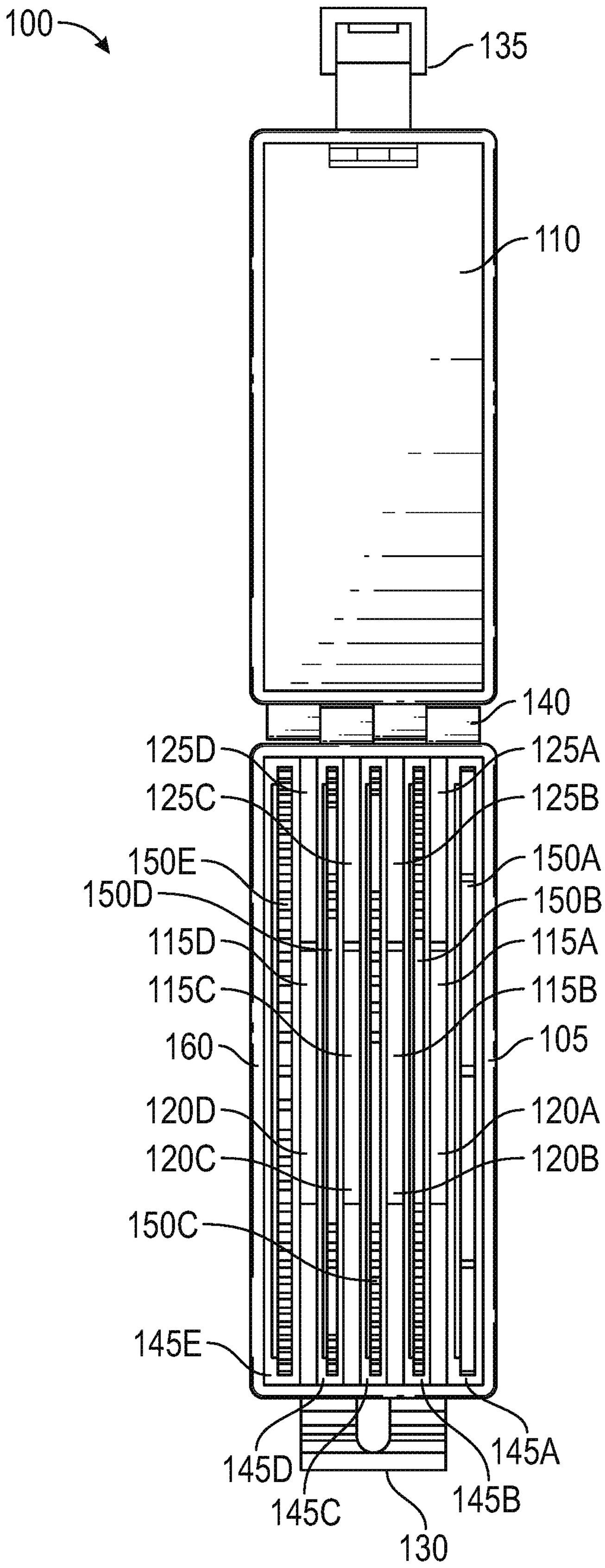
FIG. 3 illustrates a top view of an open and occupied optical accessory case.

FIG. 3 illustrates a top view of open and occupied optical accessory case 100. Accessory case 100 may be cylindrical in shape when in a closed position and include base 105, which may constitute the first portion of the cylinder, and cap 110 which may constitute the second portion of the cylinder. In an alternative embodiment, one or more of cap 110 and base 104 may be a cuboidal, spherical, or polyhedral shape. The outside portion of cap 110 and the outside portion of base 105 may be substantially similar in shape and/or size. Substantially in this circumstance means within 10%. Further, one or more of base 105 and cap 110 may be transparent or semitransparent allowing the visibility of one or more accessories 150A-E placed within case 100 through base 105 and/or cap 110. Cap 110 may attach to base 105 by hinge 140. A first end of hinge 140 may attach to a first edge of cap 110. A second end of hinge 140 may attach to a first edge of base 105. This may allow accessory case 100 to be opened and closed both protecting and allowing access to the inside portions of both base 105 and cap 110. Latch 135 may be attached to a second edge of cap 110 and anchor 130 may be attached to a second edge of base 105. When in an opened position latch 135 and anchor 130 may be located at opposite ends of case 100. When in a closed position cap 110 may be positioned on top of base 105. In a closed position, latch 135 may interact with anchor 130 releasably securing cap 110 to base 105. Alternatively, cap 110 may include anchor 130 and base 105 may include latch 135. Further, in an alternate embodiment, accessory case 100 may include cap 110 and base 105 without one or more of hinge 140, latch 135, and anchor 130 wherein their attachment may be facilitated through one or more of the attachments listed below.

The interaction between latch 135 and anchor 130 may similarly be exchanged with various types of connectors including but not limited to latches such as cam, compression, slam, swell, or sliding latches, or catches such as magnetic catches friction catches, touch catches, recessed catches, specialty catches, or other conventional connecting attachments such as a snap, hook and loop, compression fit, magnetic attachments or other attachments known in the art.

Base 105 may further include one or more dividers 115A-D. If a plurality of dividers 115A-D is included in case 100 the distance between each divider and between the divider and the outer edge of base 105 may vary. The space created by the distance between dividers 115A-D and between dividers 115A and 115D and the outside edge may create slots 145A-E where accessories 150A-E may be placed. For example, the two outside slots 145A and 145E may be wider than slots 145B-D. Further, slot 145A may be wider than slot 145E creating large (145A), medium 145E, and small slots (145B-D). The different sizes of slots may accommodate different-sized accessories 150A-E. Alternatively, slots 145A-E may be equally sized.

Dividers 115A-D may include pedestals 125A-D and columns 120A-D. Pedestals 125A-D may attach to base 105 along an inside edge of base 105. Alternatively, pedestals 125A-D may attach to base 105 at a plurality of locations. The attachment of pedestals 125A-D may be continuous along the inside portion of base 105. The upper portion of pedestals 125A-D may end before upper edge 160 of base 105. Columns 120A-D may attach to pedestals 125A-D and extend upward beyond upper edge 160 of base 105. The bottom portion of columns 120A-D, at the point of attachment to pedestals 125A-D, may be narrower than the upper portion of pedestals 125A-D.

Columns 120A-D may extend off pedestals 125A-D substantially perpendicular to the horizontal plane defined by the upper portion of pedestals 125A-D. The upper end of columns 120A-D may be rounded such that the upper end of columns 120A-D does not contact cap 110 when in a closed position. One or more of accessories 150A-E placed in a slot, next to one or more dividers 115A-D, may extend above the upper end of columns 120A-D. Columns 120A-D may be narrower than accessories 150A-E place within case 100 which may allow magnetic attraction to occur between different accessories. Alternatively, the upper end of columns 120A-D may extend beyond one or more accessories 150A-E that are placed within case 100.

Accessories 150A-E may be placed in slots 145A-E of case 100. Some magnetic attraction may exist between one or more accessories 150A-E as they rest within case 100. This magnetic attraction may keep accessories 150A-E snuggly positioned within case 100 to help prevent the jostling of accessories 150A-E while positioned within case 100. Further, the magnetic attraction may help keep accessories 150A-E from falling out even when cap 110 is unlatched or unattached to base 105. Dividers 115A-D, while allowing magnetic attraction, may also reduce the magnetic attraction between one or more accessories 150A-E by creating a distance between the accessories 150AS-E. For example, the width of dividers 115A-D separates a plurality of accessories 150A-E while still allowing magnetic attraction to exist between two or more of the plurality of accessories 150A-E when placed within case 100. This, in turn, may aid in the removal of one of the individual accessories 150A-E.

Figure 4:
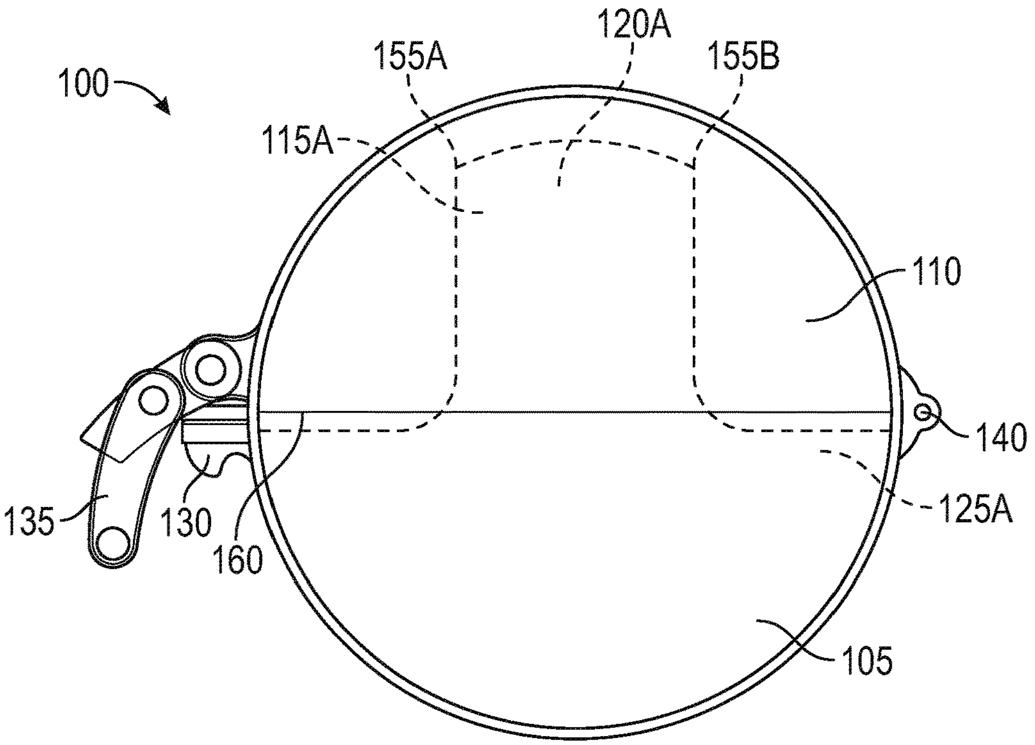
FIG. 4 illustrates a side view of a closed and empty optical accessory case.

FIG. 4 illustrates a side view of closed and empty optical accessory case 100. Accessory case 100 may be cylindrical in shape when in a closed position and include base 105, which may constitute the first portion of the cylinder, and cap 110 which may constitute the second portion of the cylinder. In an alternative embodiment, one or more of cap 110 and base 104 may be a cuboidal, spherical, or polyhedral shape. The outside portion of cap 110 and the outside portion of base 105 may be substantially similar in shape and/or size. Substantially in this circumstance means within 10%. Further, one or more of base 105 and cap 110 may be transparent or semitransparent allowing the visibility of one or more accessories placed within case 100 through base 105 and/or cap 110. Allowing the user to determine the number of accessories positioned with the case 100 while being shut. Cap 110 may attach to base 105 by hinge 140. A first end of hinge 140 may attach to a first edge of cap 110. A second end of hinge 140 may attach to a first edge of base 105. This may allow accessory case 100 to be opened and closed both protecting and allowing access to the inside portions of both base 105 and cap 110. Latch 135 may be attached to a second edge of cap 110 and anchor 130 may be attached to a second edge of base 105. When in an opened position latch 135 and anchor 130 may be located at opposite ends of case 100. When in a closed position cap 110 may be positioned on top of base 105. In a closed position, latch 135 may interact with anchor 130 releasably securing cap 110 to base 105. Alternatively, cap 110 may include anchor 130 and base 105 may include latch 135. Further, in an alternate embodiment, accessory case 100 may include cap 110 and base 105 without one or more of hinge 140, latch 135, and anchor 130 wherein their attachment may be facilitated through one or more of the attachments listed below.

The interaction between latch 135 and anchor 130 may similarly be exchanged with various types of connectors including but not limited to latches such as cam, compression, slam, swell, or sliding latches, or catches such as magnetic catches friction catches, touch catches, recessed catches, specialty catches, or other conventional connecting attachments such as a snap, hook and loop, compression fit, magnetic attachments or other attachments known in the art.

Base 105 may further include one or more dividers 115A-D. Only divider 115A is depicted due to perspective. If a plurality of dividers 115A-D is included in case 100 the distance between each divider and between the divider and the outer edge of base 105 may vary. For example, the two outside slots may be wider than the three middle slots. Further, one of the outside slots may be wider than the other creating large, medium, and small slots. The different sizes of slots may accommodate different-sized accessories.

Dividers 115A-D may include pedestals 125A-D and columns 120A-D. Only dividers 115A-D and pedestals 125A-D are depicted due to perspective. However, columns 120A-D may be included as depicted in at least FIGS. 1-3. Pedestals 125A-D may attach to base 105 along an inside edge of base 105. Alternatively, pedestals 125A-D may attach to base 105 at a plurality of locations. The attachment of pedestals 125A-D may be continuous along the inside portion of base 105. The upper portion of pedestals 125A-D may end before upper edge 160 of base 105. Columns 120A-D may attach to pedestals 125A-D and extend upward beyond the upper edge 160 of base 105. The bottom portion of columns 120A-D, at the point of attachment to pedestals 125A-D, may be narrower than the upper portion of pedestals 125A-D.

Columns 120A-D may extend off pedestals 125A-D substantially perpendicular to the horizontal plane defined by the upper portion of pedestals 125A-D. The upper end of columns 120A-D may be rounded such that the upper end of columns 120A-D does not contact cap 110 when in a closed position. Accordingly, corners 155A and 115B may be the lowest points of the top portion of columns 120A-D. The rounded portion of the top part of columns 120A-D may curve at an angle that is substantially similar to the outside curvature of case 100. Substantially similar in this circumstance means plus or minus 10%. An accessory placed in a slot, next to one or more dividers 115A-D, may extend above the upper end of columns 120A-D. Columns 120A-D may be narrower than the optical accessories placed within case 100 which may allow magnetic attraction to occur between different accessories. Alternatively, the upper end of columns 120A-D may extend beyond one or more accessories that are placed within case 100.

Accessories may be placed within case 100. Some magnetic attraction may exist between the different accessories as they rest within case 100. This magnetic attraction may keep accessories snuggly positioned within case 100 to help prevent the jostling of the accessories within case 100. Further, the magnetic attraction may help keep the accessories from falling out even when cap 110 is unlatched or unattached to base 105. This may occur as magnetic attraction may exist between one or more accessories through dividers 115A-D sandwiching one or more attached dividers 115A-D between one or more accessories. Dividers 115A-D, while allowing magnetic attraction, may also reduce the magnetic attraction by creating a distance between the accessories. This in turn may facilitate the removal of an individual accessory.

Figure 5:
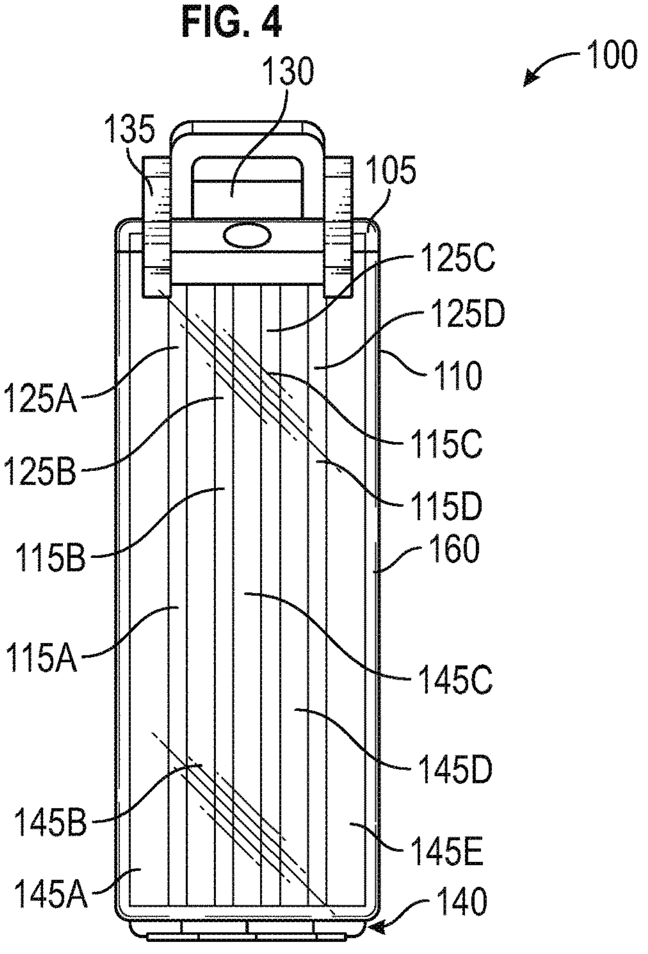
FIG. 5 illustrates a top view of a closed and empty optical accessory case.

FIG. 5 illustrates a top view of closed and empty optical accessory case 100. Accessory case 100 may be cylindrical in shape when in a closed position and include base 105, which may constitute the first portion of the cylinder, and cap 110 which may constitute the second portion of the cylinder. In an alternative embodiment, one or more of cap 110 and base 104 may be a cuboidal, spherical, or polyhedral shape. The outside portion of cap 110 and the outside portion of base 105 may be substantially similar in shape and/or size. Substantially in this circumstance means within 10%. Further, one or more of base 105 and cap 110 may be transparent or semitransparent allowing the visibility of one or more accessories placed within case 100 through base 105 and/or cap 110. Cap 110 may attach to base 105 by hinge 140. A first end of hinge 140 may attach to a first edge of cap 110. A second end of hinge 140 may attach to a first edge of base 105. This may allow accessory case 100 to be opened and closed both protecting and allowing access to the inside portions of both base 105 and cap 110. Latch 135 may be attached to a second edge of cap 110 and anchor 130 may be attached to a second edge of base 105. When in an opened position latch 135 and anchor 130 may be located at opposite ends of case 100. When in a closed position cap 110 may be positioned on top of base 105. In a closed position, latch 135 may interact with anchor 130 releasably securing cap 110 to base 105. Alternatively, cap 110 may include anchor 130 and base 105 may include latch 135. Further, in an alternate embodiment, accessory case 100 may include cap 110 and base 105 without one or more of hinge 140, latch 135, and anchor 130 wherein their attachment may be facilitated through one or more of the attachments listed below.

The interaction between latch 135 and anchor 130 may similarly be exchanged with various types of connectors including but not limited to latches such as cam, compression, slam, swell, or sliding latches, or catches such as magnetic catches friction catches, touch catches, recessed catches, specialty catches, or other conventional connecting attachments such as a snap, hook and loop, compression fit, magnetic attachments or other attachments known in the art.

Base 105 may further include one or more dividers 115A-D. If a plurality of dividers 115A-D is included in case 100 the distance between each divider and between the divider and the outer edge of base 105 may vary. The space created by the distance between dividers 115A-D and between dividers 115A and 115D and the outside edge may create slots 145A-E where the accessories may be placed. For example, the two outside slots 145A and 145E may be wider than slots 145B-D. Further, slot 145A may be wider than slot 145E creating large (145A), medium 145E, and small slots (145B-D). The different sizes of slots 145A-E may accommodate different-sized accessories. Alternatively, slots 145A-E may be equally sized.

Dividers 115A-D may include pedestals 125A-D and columns 120A-D. Columns 120A-D are not depicted due to perspective but may be included as seen in FIGS. 1-4. Pedestals 125A-D may attach to base 105 along an inside edge of base 105. Alternatively, pedestals 125A-D may attach to base 105 at a plurality of locations. The attachment of pedestals 125A-D may be continuous along the inside portion of base 105. The upper portion of pedestals 125A-D may end before the upper edge of base 105. Columns 120A-D may attach to pedestals 125A-D and extend upward beyond upper edge 160 of base 105. The bottom portion of columns 120A-D, at the point of attachment to pedestals 125A-D, may be narrower than the upper portion of pedestals 125A-D.

Columns 120A-D may extend off pedestals 125A-D substantially perpendicular to the horizontal plane defined by the upper portion of pedestals 125A-D. The upper end of columns 120A-D may be rounded such that the upper end of columns 120A-D does not contact cap 110 when in a closed position. Columns 120A-D may be narrower than the optical accessories placed within case 100 which may allow magnetic attraction to occur between different accessories. The accessories placed in one or more slots 145A-E, next to one or more dividers 115A-D, may extend above the upper end of columns 120A-D. Alternatively, the upper end of columns 120A-D may extend beyond one or more accessories that are placed within case 100.

One or more accessories may be placed within case 100. Some magnetic attraction may exist between the different accessories as they rest within case 100. This magnetic attraction may keep the accessories snuggly positioned within case 100 to help prevent the jostling of the accessories within case 100. Further, the magnetic attraction may help keep the accessories from falling out even when cap 110 is unlatched or unattached to base 105. Dividers 115A-D, while allowing magnetic attraction, may also reduce the magnetic attraction by creating a distance between the accessories. This, in turn, may aid in the removal of an individual accessory.

Figure 6:
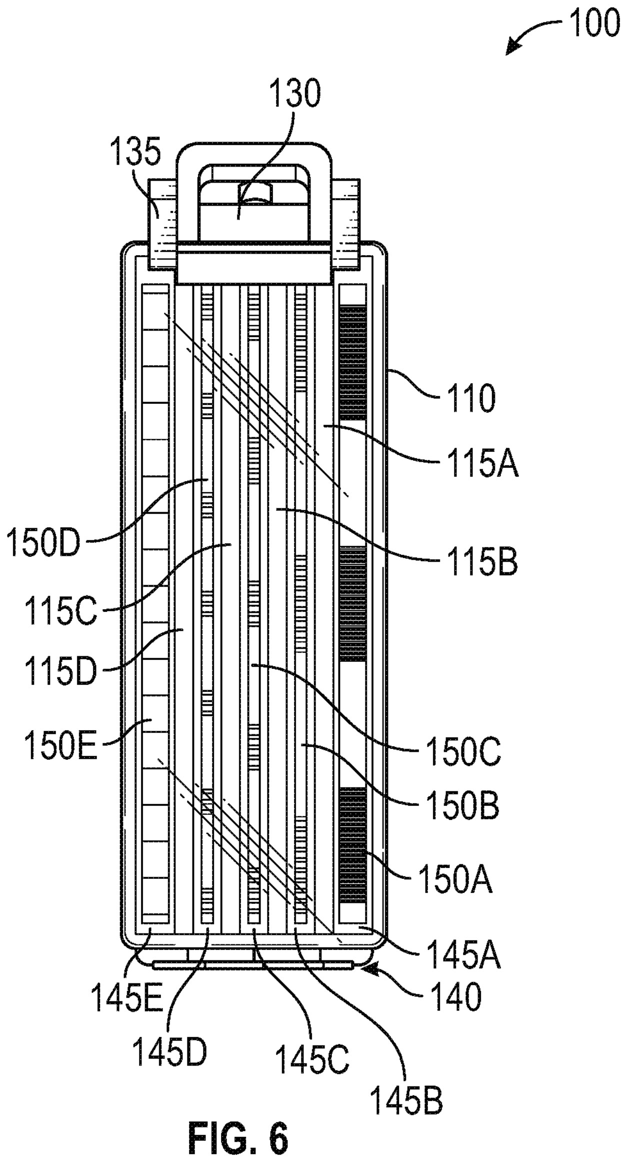
FIG. 6 illustrates a top view of a closed and occupied optical accessory case.

FIG. 6 illustrates a top view of closed and occupied optical accessory case 100. Accessory case 100 may be cylindrical in shape when in a closed position and include base 105 as depicted in FIGS. 1-5, which may constitute a first portion of the cylinder, and cap 110 which may constitute the second portion of the cylinder. In an alternative embodiment, one or more of cap 110 and base 104 may be a cuboidal, spherical, or polyhedral shape. The outside portion of cap 110 and the outside portion of base 105 may be substantially similar in shape and/or size. Substantially in this circumstance means within 10%. Further, one or more of base 105 and cap 110 may be transparent or semitransparent allowing the visibility of one or more accessories 150A-E placed within case 100 through base 105 and/or cap 110. Cap 110 may attach to base 105 by hinge 140. A first end of hinge 140 may attach to a first edge of cap 110. A second end of hinge 140 may attach to a first edge of base 105. This may allow accessory case 100 to be opened and closed both protecting and allowing access to the inside portions of both base 105 and cap 110. Latch 135 may be attached to a second edge of cap 110 and anchor 130 may be attached to a second edge of base 105. When in an opened position latch 135 and anchor 130 may be located at opposite ends of case 100. When in a closed position cap 110 may be positioned on top of base 105. In a closed position, latch 135 may interact with anchor 130 releasably securing cap 110 to base 105. Alternatively, cap 110 may include anchor 130 and base 105 may include latch 135. Further, in an alternate embodiment, accessory case 100 may include cap 110 and base 105 without one or more of hinge 140, latch 135, and anchor 130 wherein their attachment may be facilitated through one or more of the attachments listed below.

The interaction between latch 135 and anchor 130 may similarly be exchanged with various types of connectors including but not limited to latches such as cam, compression, slam, swell, or sliding latches, or catches such as magnetic catches friction catches, touch catches, recessed catches, specialty catches, or other conventional connecting attachments such as a snap, hook and loop, compression fit, magnetic attachments or other attachments known in the art.

Base 105 may further include one or more dividers 115A-D. If a plurality of dividers 115A-D is included in case 100 the distance between each divider and between the divider and the outer edge of base 105 may vary. The space created by the distance between dividers 115A-D and between dividers 115A and 115D and the outside edge may create slots 145A-E where accessories 150A-E may be placed. For example, the two outside slots 145A and 145E may be wider than slots 145B-D. Further, slot 145A may be wider than slot 145E creating large (145A), medium 145E, and small slots (145B-D). The different sizes of slots may accommodate different-sized accessories 150A-E. Alternatively, slots 145A-E may be equally sized.

Dividers 115A-D may include pedestals 125A-D and columns 120A-D. Columns 120A-D and pedestals 125A-D are not depicted/distinguishable due to perspective but may be included as seen in FIGS. 1-4. Pedestals 125A-D may attach to base 105 along an inside edge of base 105. Alternatively, pedestals 125A-D may attach to base 105 at a plurality of locations. The attachment of pedestals 125A-D may be continuous along the inside portion of base 105. The upper portion of pedestals 125A-D may end before upper edge 160 of base 105. Columns 120A-D may attach to pedestals 125A-D and extend upward beyond upper edge 160 of base 105. The bottom portion of columns 120A-D, at the point of attachment to pedestals 125A-D, may be narrower than the upper portion of pedestals 125A-D.

Columns 120A-D may extend off pedestals 125A-D substantially perpendicular to the horizontal plane defined by the upper portion of pedestals 125A-D. The upper end of columns 120A-D may be rounded such that the upper end of columns 120A-D does not contact cap 110 when in a closed position. One or more of accessories 150A-E placed in a slot, next to one or more dividers 115A-D, may extend above the upper end of columns 120A-D. Columns 120A-D may be narrower than optical accessories 150A-E placed within case 100 which may allow magnetic attraction to occur between different accessories 150A-E. Alternatively, the upper end of columns 120A-D may extend beyond one or more accessories 150A-E that are placed within case 100.

Accessories 150A-E may be placed in slots 145A-E of case 100. Some magnetic attraction may exist between one or more accessories 150A-E as they rest within case 100. This magnetic attraction may keep accessories 150A-E snuggly positioned within case 100 to help prevent the jostling of accessories 150A-E while positioned within case 100. Further, the magnetic attraction may help keep accessories 150A-E from falling out even when cap 110 is unlatched or unattached to base 105. Dividers 115A-D, while allowing magnetic attraction, may also reduce the magnetic attraction between one or more accessories 150A-E by creating a distance between the accessories 150AS-E. This, in turn, may aid in the removal of one of the individual accessories 150A-E.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered exemplary only, with a true scope and spirit of the invention being indicated by the following claims.

What is claimed is:

1. An optical accessory case comprising:

a cap, which forms a top of the optical accessory case;

a base, which forms a bottom of the optical accessory case, and which is connected to the cap by a hinge;

one or more dividers attached to the base and positioned to receive one or more camera filters, each one of the one or more dividers further comprising:

a pedestal attached continuously to the base along an inside portion of the base, the pedestal extending from a bottom of the base to below an upper edge of the base; and a column attached to the pedestal.

2. The optical accessory case of claim 1, wherein the column extends upward beyond an upper edge of the base.

3. The optical accessory case of claim 2, wherein at a point of attachment between the pedestal and the column, where a bottom portion of the column attaches to an upper portion of the pedestal, the bottom portion of the column is less wide than the upper portion of the pedestal.

4. The optical accessory case of claim 3, wherein the entire column is less wide than the pedestal.

5. The optical accessory case of claim 1, wherein the one or more dividers form one or more optical accessory slots within the optical accessory case which optical accessory slots are separated from each one of the one or more other optical accessory slots by the the pedestal and the column.

6. The optical accessory case of claim 1, wherein an upper portion of the pedestal is flat on either side of the column.

7. The optical accessory case of claim 1, wherein at least a portion of the optical accessory case is transparent.

8. The optical accessory case of claim 1, wherein at least a portion of the optical accessory case is semitransparent.

9. The optical accessory case of claim 1, wherein the optical accessory case is cylindrically shaped.

10. The optical accessory case of claim 1, further comprises:

a plurality of slots positioned on both sides of the one or more dividers.

11. The optical accessory case of claim 10, wherein the size of one or more of the plurality of slots differs from another one of the plurality of slots.

12. The optical accessory case of claim 1, further comprises:

a latch.

13. The optical accessory case of claim 12, wherein the latch attaches to the cap.

14. The optical accessory case of claim 13, further comprises:

an anchor.

15. The optical accessory case of claim 14, wherein the anchor is attached to the base.

16. The optical accessory case of claim 15, wherein when the optical accessory case is in a closed position the latch removably connects to the anchor.

17. The optical accessory case of claim 1, wherein the hinge attaches to the base at an opposite end to the anchor.

* * * * *